United States Patent
Vinciarelli et al.

[11] Patent Number: 5,490,057
[45] Date of Patent: Feb. 6, 1996

[54] FEEDBACK CONTROL SYSTEM HAVING PREDICTABLE OPEN-LOOP GAIN

[75] Inventors: Patrizio Vinciarelli, Boston; Louis A. Bufano, Tewksbury, both of Mass.

[73] Assignee: VLT Corporation, Andover, Mass.

[21] Appl. No.: 238,960

[22] Filed: May 6, 1994

[51] Int. Cl.$^6$ ................................................... G05B 13/02
[52] U.S. Cl. ........................... 364/157; 363/16; 364/183; 364/553
[58] Field of Search ................................... 364/148, 152, 364/157, 176, 183, 553; 323/235, 285, 299; 318/800; 363/41, 15, 21, 28, 16

[56] References Cited

U.S. PATENT DOCUMENTS

| | | | |
|---|---|---|---|
| 4,123,698 | 10/1978 | Timko et al. | 323/1 |
| 4,168,492 | 9/1979 | Uya | 340/347 |
| 4,415,959 | 11/1983 | Vinciarelli | 363/21 |
| 4,630,187 | 12/1986 | Henze | 364/162 X |
| 4,725,940 | 2/1988 | Henze | 364/162 X |
| 4,818,951 | 4/1989 | Roberts | 330/254 |
| 4,862,343 | 8/1989 | Nomura et al. | 364/161 X |
| 4,972,512 | 11/1990 | Garskamp | 455/341 |
| 5,282,129 | 1/1994 | Losic | 364/157 X |

OTHER PUBLICATIONS

Analog Devices, Inc., "Linear Products Databook", 1990/1991, pp. 6–1 to 6–72 and 12–7 to 12–15.
Vinciarelli et al., U.S. Patent Application No. 08/077,011, "Power Converter Configuration, Control and Construction", filed Jun. 14, 1993.

*Primary Examiner*—Joseph Ruggiero
*Attorney, Agent, or Firm*—Fish & Richardson

[57] ABSTRACT

A closed-loop feedback system has first and second gain elements. The first gain element has a transfer function such that $Xd=Kg * (Xcont)^z$, where Xcont is a control variable input signal of the first gain element, Xd is a controlled variable output signal of the first gain element, and Kg and z are independent of Xcont. The second gain element has a transfer function h1 such that Xcont=h1(Xe) where Xe is a control variable input signal of the second gain element and Xcont is a controlled variable output signal of the second gain element. The function h1 is of a form which satisfies $[1/h1(Xe)]*[\delta h1(Xe)/\delta Xe]=Ke$, where Ke is independent of Xe.

51 Claims, 14 Drawing Sheets

|  | Kx = 2 | | Kx = 7 | | Kx = 12 | | Kx = 17 | | Kx = 22 | |
|---|---|---|---|---|---|---|---|---|---|---|
|  | Verr | Vcont | Verr | Vcont | Verr | Vcont | Verr | Vcont | Verr | Vcont |
|  | Aol | | Aol | | Aol | | Aol | | Aol | |
| Kp*Vin = 20 | -0.051 | 0.2551 | -0.082 | 0.2583 | -0.096 | 0.2596 | -0.104 | 0.2605 | -0.111 | 0.2611 |
|  | 102.1 | | 103.3 | | 103.8 | | 104.2 | | 104.4 | |
| Kp*Vin = 60 | -0.079 | 0.0860 | -0.110 | 0.0870 | -0.123 | 0.0874 | -0.132 | 0.0878 | -0.138 | 0.0879 |
|  | 103.1 | | 104.4 | | 104.9 | | 105.3 | | 105.5 | |
| Kp*Vin = 100 | -0.091 | 0.0518 | -0.122 | 0.0525 | -0.136 | 0.0527 | -0.144 | 0.0529 | -0.151 | 0.0530 |
|  | 103.7 | | 104.9 | | 105.4 | | 105.8 | | 106.0 | |
| Kp*Vin = 140 | -0.100 | 0.0371 | -0.131 | 0.0376 | -0.144 | 0.0378 | -0.153 | 0.0379 | -0.159 | 0.0380 |
|  | 104 | | 105.2 | | 105.8 | | 106.1 | | 106.4 | |
| Kp*Vin = 180 | -0.106 | 0.0290 | -0.137 | 0.0293 | -0.150 | 0.0294 | -0.159 | 0.0295 | -0.165 | 0.0296 |
|  | 104.2 | | 105.5 | | 106 | | 106.4 | | 106.6 | |

FIG. 9

FEEDBACK CONTROL SYSTEM HAVING PREDICTABLE OPEN-LOOP GAIN

BACKGROUND OF THE INVENTION

This invention relates to feedback control.

In an example of a feedback control system, FIG. 1 shows a block diagram of a power converter 10 which accepts power from an input voltage source 14, of value Vin, and delivers power to a load 18 at a regulated load voltage Vout. Output voltage regulation is accomplished by negative feedback. An error voltage, Ve 34, representing the difference between a reference voltage 32 (indicative of the desired setpoint value for the output voltage Vout) and a measurement of Vout (the voltage, Vd 31, delivered by the divider 24), is fed to a controller 28 which delivers a control signal, Vcont 22, to the power conversion stage 12. If Vd is above Vref, Vcont decreases; if Vd is below Vref, Vcont increases. The value of Vcont is indicative of the value of the parameter which controls the output of the power conversion stage 12. For example, in a pulse-width-modulated (PWM) power conversion scheme, Vcont is indicative of duty cycle; in a zero-current switching scheme, Vcont is indicative of operating frequency. An increase in Vcont increases the power throughput of the power conversion stage, and vice versa.

Issues relating to closed-loop stability and both the steady-state and transient response characteristics of closed-loop feedback control systems are well documented. In this regard, the open-loop characteristics (e.g., the open-loop gain and phase shift as a function of frequency) of the feedback control system 10 are important. Conventionally, the design of closed-loop systems involves understanding the gain/phase characteristics of the different elements within the loop and designing a "linear" controller (in which gain is not a function of operating point; e.g., in FIG. 1, the incremental change in Vcont which results from a fixed incremental change in Ve will be the same irrespective of the average values of Ve and Vcont) which, when combined with other loop elements, results in an open-loop gain/phase characteristic which satisfies some set of predefined steady-state and transient performance criteria. Thus, for example, the controller might simply consist of a linear amplifier whose gain/phase characteristics are adjusted to provide an overall open-loop gain vs. frequency characteristic 36 of the kind shown in FIG. 2. The open-loop gain is designed to be relatively constant and equal to A1 up to a frequency f1. Above that frequency the gain is rolled off so that the gain and phase (the phase is not shown in the Figure) margins at crossover (e.g., the frequency at which the gain Aol=1) are consistent with stable closed-loop operation.

Alternatively, controller 28 might be modified, as shown in FIG. 3, to provide an overall open-loop gain characteristic 38 like the one shown in FIG. 4. In controller 28, amplifier 42 has a very high DC gain which rolls off with frequency (e.g., an integrator). In the closed-loop system, this amplifier will adjust its output, Veq, to an average value which forces the average value of the system error, Ve, to zero, thereby ensuring very accurate regulation of the converter DC output voltage, Vout. Veq is summed with the output of another linear amplifier 40 which is designed so that, when it is combined with other loop elements, the result is an open-loop gain characteristic as shown in FIG. 4. The high gain of the integrating amplifier dominates below a frequency fo. Above fo the linear amplifier dominates, providing both a region of relatively high "midband" gain (e.g., between frequencies f0 and f1) and a controlled rolloff in gain above f1 to ensure that the gain (and phase) margin at crossover (e.g., the frequency, f2, at which the gain Aol=1) are consistent with stable closed-loop operation.

In many applications the open-loop gain characteristic will change with both system operating point and environmental factors. For example, a broad class of PWM power conversion stages exhibit a gain characteristic which is proportional to converter input voltage, Vin. This means that if a system using such a converter is designed to operate over a 4:1 range in input voltage, the open-loop gain will vary at least by this amount as Vin varies over its range. Gain variations with operating conditions (e.g., Vin, power output), as well as nonlinear gain characteristics, are exhibited by other types of power conversion stages, such as zero-current switching converters. In nonideal systems the normal tolerance variations in system components, losses in energy storage elements, and dependencies of component characteristics on environmental factors, such as temperature, will also affect open-loop gain.

As a result, in many applications the open-loop gain cannot be characterized by a single plot of the kinds shown in FIGS. 2 and 4. Instead, the open-loop gain will exhibit variations (e.g., as illustrated by the family of gain plots, 38a–38d, in FIG. 5) that result from changes in system operating point and environment. As the open-loop gain varies, the attendant variations in low frequency and midband gain, crossover frequency, and gain/phase margins, will alter both the closed-loop performance and stability characteristics of the closed-loop system. Thus, conventional feedback control system design involves trading off closed-loop performance under a variety of operating conditions to ensure stable closed-loop operation under "worst-case" conditions.

Summary of the Invention

In general, in one aspect, the invention features a closed-loop feedback system having first and second gain elements. The first gain element has a transfer function such that $Xd = Kg*(Xcont)^z$, where Xcont is a control variable input signal of the first gain element, Xd is a controlled variable output signal of the first gain element, and Kg and z are independent of Xcont. The second gain element has a transfer function h1 such that Xcont=h1(Xe) where Xe is a control variable input signal of the second gain element and Xcont is a controlled variable output signal of the second gain element. The function h1 is of a form which satisfies $[1/h1(Xe)]*[\delta h1(Xe)/\delta Xe]=Ke$, where Ke is independent of Xe.

Implementations of the invention include the following features. The function h1 may be of the form $h1(Xe)= Kx*\exp(Ke*Xe)$ where Kx and Ke are independent of Xe. An input to the system may be a setpoint value, Xref, indicative of a desired value for an output signal, Xd, of the system. The system may have an open-loop gain, Aol, essentially equal to $z*Ke*Xd$. The gain of the second gain element may be proportional to its average output signal. The second gain element may include circuitry comprising a gain variable amplifier having a gain control input, and a control circuit having a gain control output connected to the gain control input of the gain variable amplifier. The control circuit may include a high-gain amplifier. The high-gain amplifier may have a bandwidth narrower than the bandwidth of the open-loop characteristic of the system. Outputs of the gain variable amplifier and the control circuit may be summed in a summing element. Inputs of the gain variable amplifier and the control circuit may be connected to receive the same input signal. A system input signal may be an error signal, Xe, indicative of the degree to which an output of the system, Xd, differs from a predetermined setpoint value, Xref, which is an input to the system. The control circuit may include an integrator, or a low pass filter. The low-pass filter may have an output connected to the gain control input of the gain variable amplifier, and the low-pass filter may have an input connected to an output of the gain control amplifier.

The first gain element may include a power converter connected between a source and a load. The power converter may have a controlled variable frequency of operation and the frequency of operation may be controlled based on a control signal received at an input of the power converter. The second gain element may have an input connected to the output of the power converter, and an output connected to the control input of the converter. The controller may include an isolation element for galvanically isolating the output of the controller from the input of the controller. The isolation element may include a magnetic coupler. The controller may include a gain adaptive amplifier, the gain of the gain adaptive amplifier being proportional to the average value of the output of the controller. The power converter may be a pulse-width modulated power converter. The power converter may be a zero-current switching power converter.

The open loop gain of the system may include a constant gain in a mid-band of frequencies, and, in other frequency bands, a gain that declines with increasing frequency. The first (second) gain element may include subelements and the transfer function of the first (second) gain element may be a composite transfer function. Xd, Xe, Xref, and Xcont may each be a voltage or a current.

In general, in another aspect, the invention features a power conversion system for converting power from a source for delivery to a load, the system including a closed-loop feedback system having a power converter and a controller with features as recited above.

In general, in another aspect, the invention features a method of causing a closed-loop feedback system to have a generally constant value of open-loop gain, by means of features recited above.

Among the advantages of the invention are the following.

Since variations in open-loop gain affect closed-loop system performance and stability, use of a controller which provides an open-loop gain characteristic (Equation 6) which is either invariant, or which varies very predictably, with changes in system operating point or environment, offers significant advantages. For example, use of such a controller provides for uniform, or very predictable, closed-loop system performance over a wide range of electrical and environmental operating conditions.

Other advantages and features will become apparent from the following description and from the claims.

DESCRIPTION

FIG. 9 is a table of the variation in open-loop gain and other loop variables.

Figure 6:
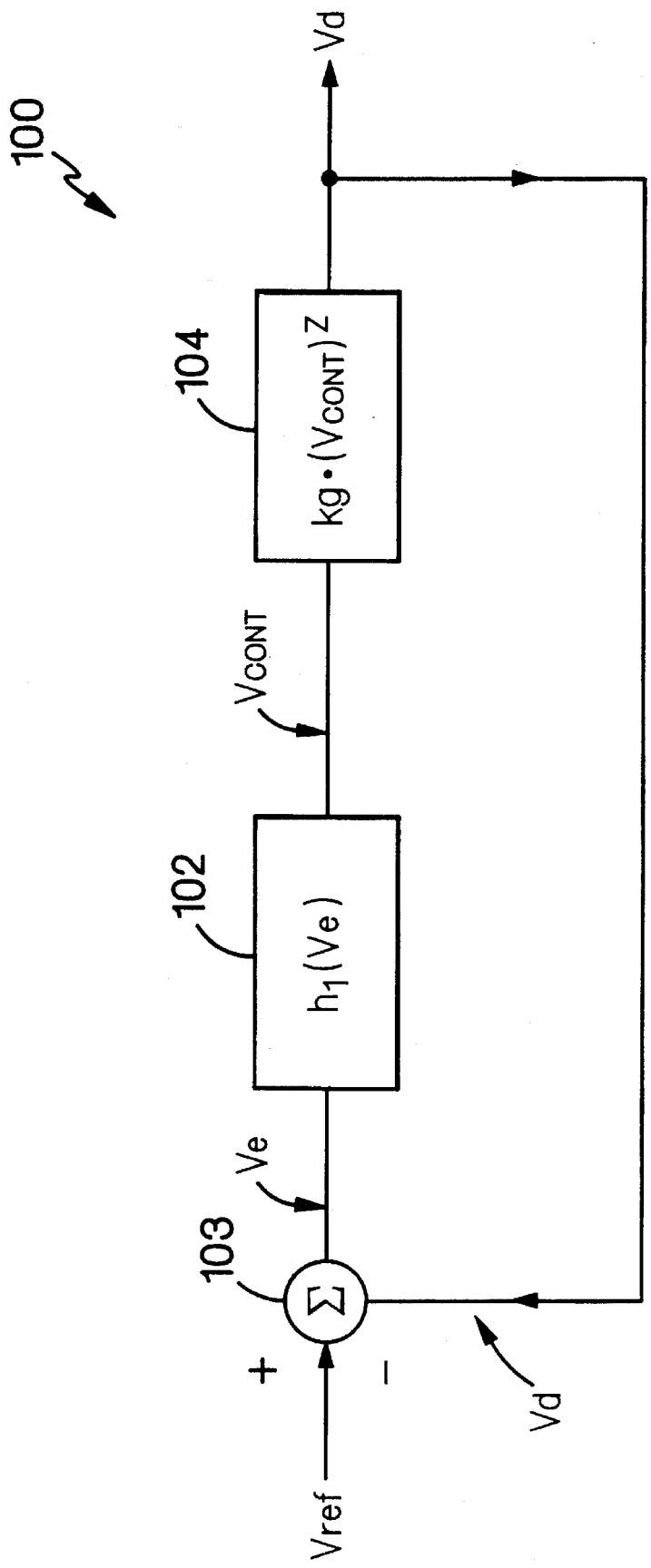
FIG. 6 is a block diagram of another feedback control system.
Figure 7:
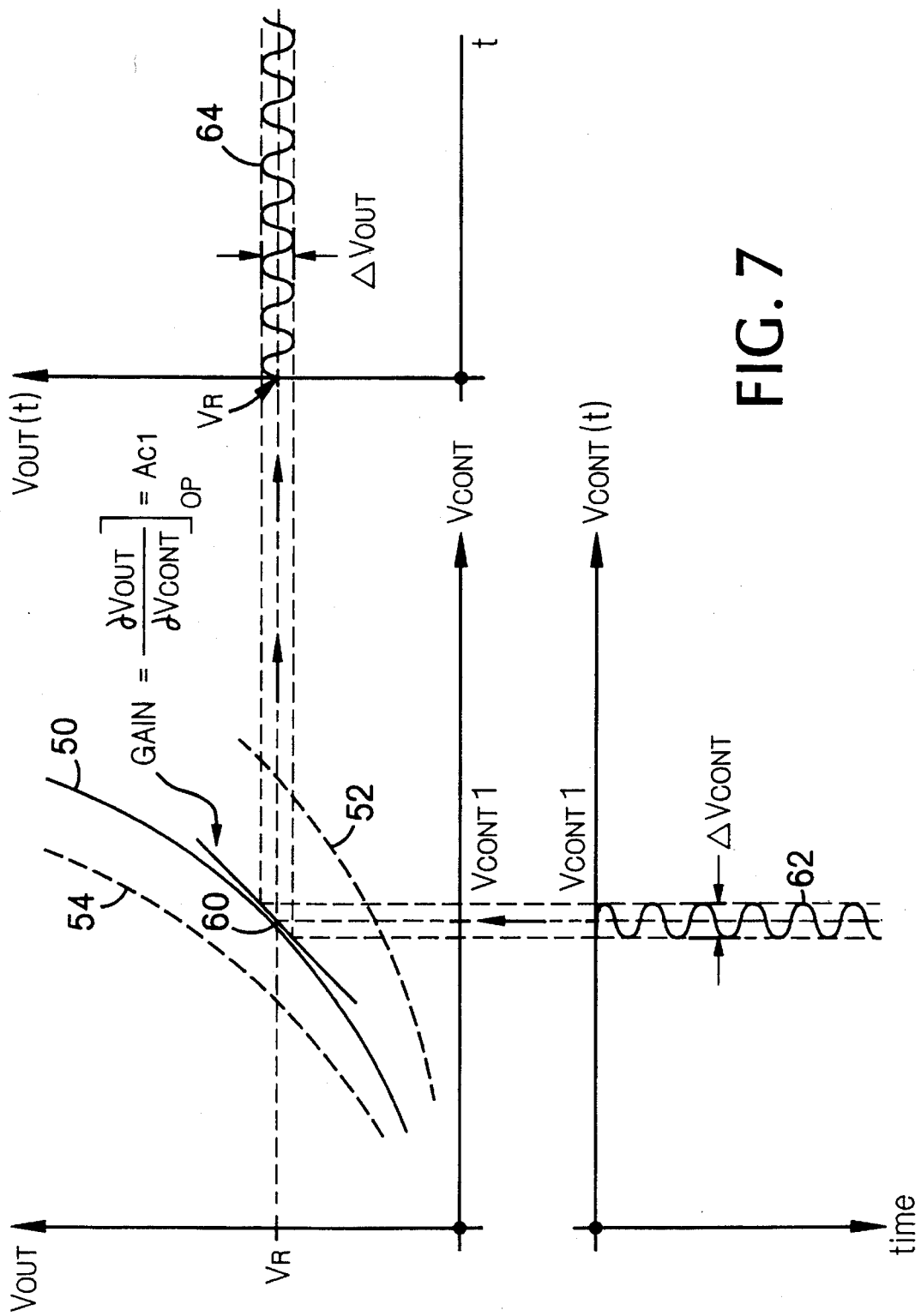
FIG. 7 shows the relationship between the transfer function of an element and the gain of the element.

FIG. 6 shows a generalized block diagram of a closed-loop feedback control system 100. The loop output, Vd, is compared to the loop setpoint, Vref, and the difference, the error signal Ve, is delivered as the input to a first gain element 102. The first gain element delivers a control signal, Vcont, to a second gain element 104 which generates the loop output Vd. The loop is arranged so that a divergence in the value of Vd away from the value of Vref will result in variations in Ve and Vcont which will counteract that divergence. Each element which forms the loop (e.g., elements 102, 104) may be characterized in terms of its transfer function and gain. For example, FIG. 7 shows a portion of a transfer function 50 for a hypothetical second gain element 104. The transfer function 50 relates the absolute value of the output of the element, Vout, to the absolute value of the element's input, Vcont. Each point on the transfer function 50 represents an operating point (e.g., as shown in the Figure, an input Vcont=Vcont1 results in an output Vout=VR). At any particular operating point the gain of the element is equal to the slope of the transfer function at the operating point. For the operating point 60 shown, the gain is Ac1. In further illustration, a waveform 62 of a hypothetical input to the gain element, Vcont(t), consists of a DC component, equal to Vcont1, summed with a very small sinusoidal component having a peak-to-peak amplitude equal to $\Delta$Vcont at a frequency fs. For the input waveform shown, the transfer function produces the output waveform 64 Vout(t) consisting of a DC component equal to VR and a sinusoidal component, also of frequency fs, having a peak-to-peak amplitude equal to $\Delta$Vout, where $$\Delta Vout = Ac1 * \Delta Vcont.$$

Figure 2:
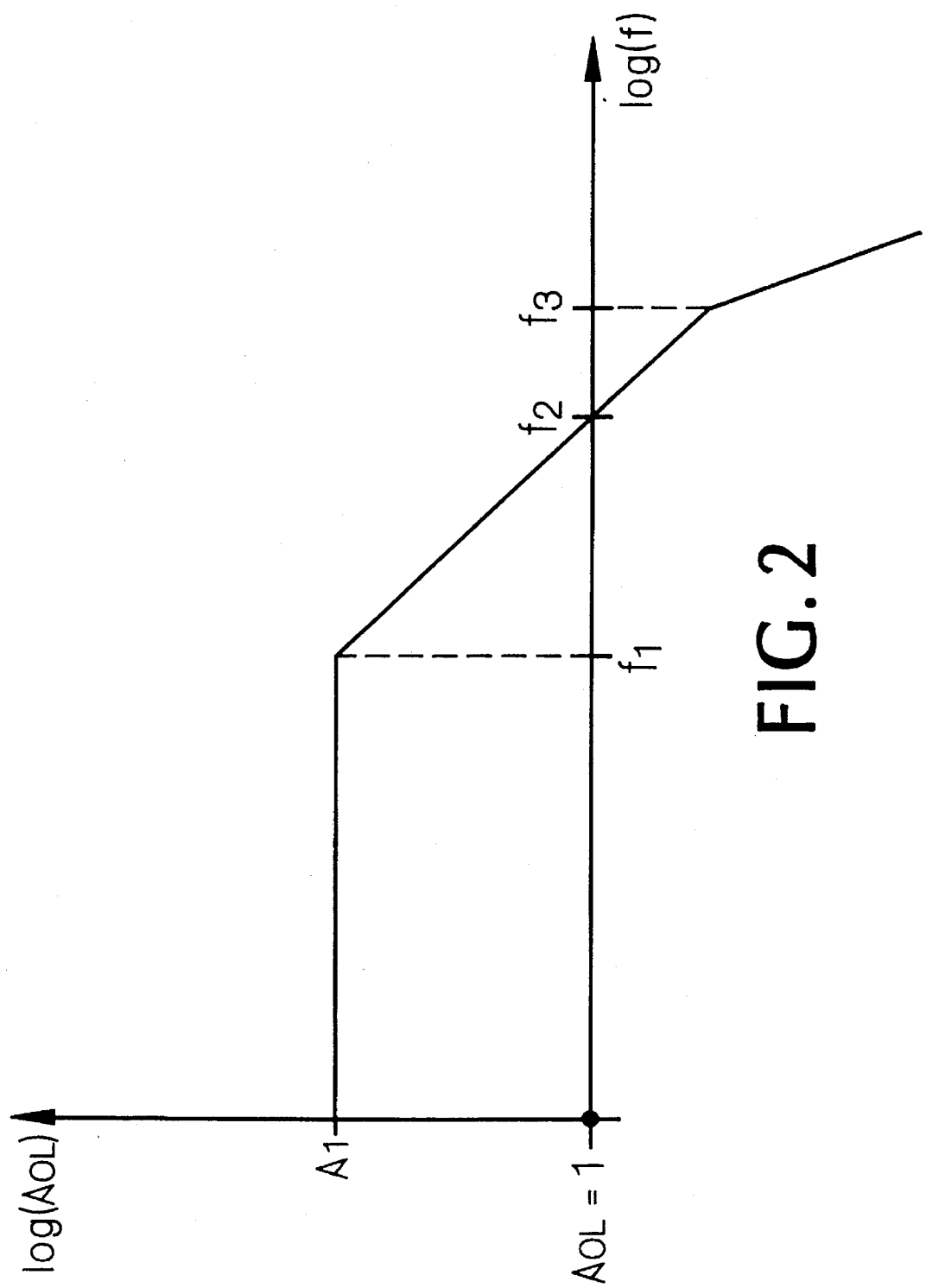
FIG. 2 is a plot of open-loop gain vs. frequency.
Figure 4:
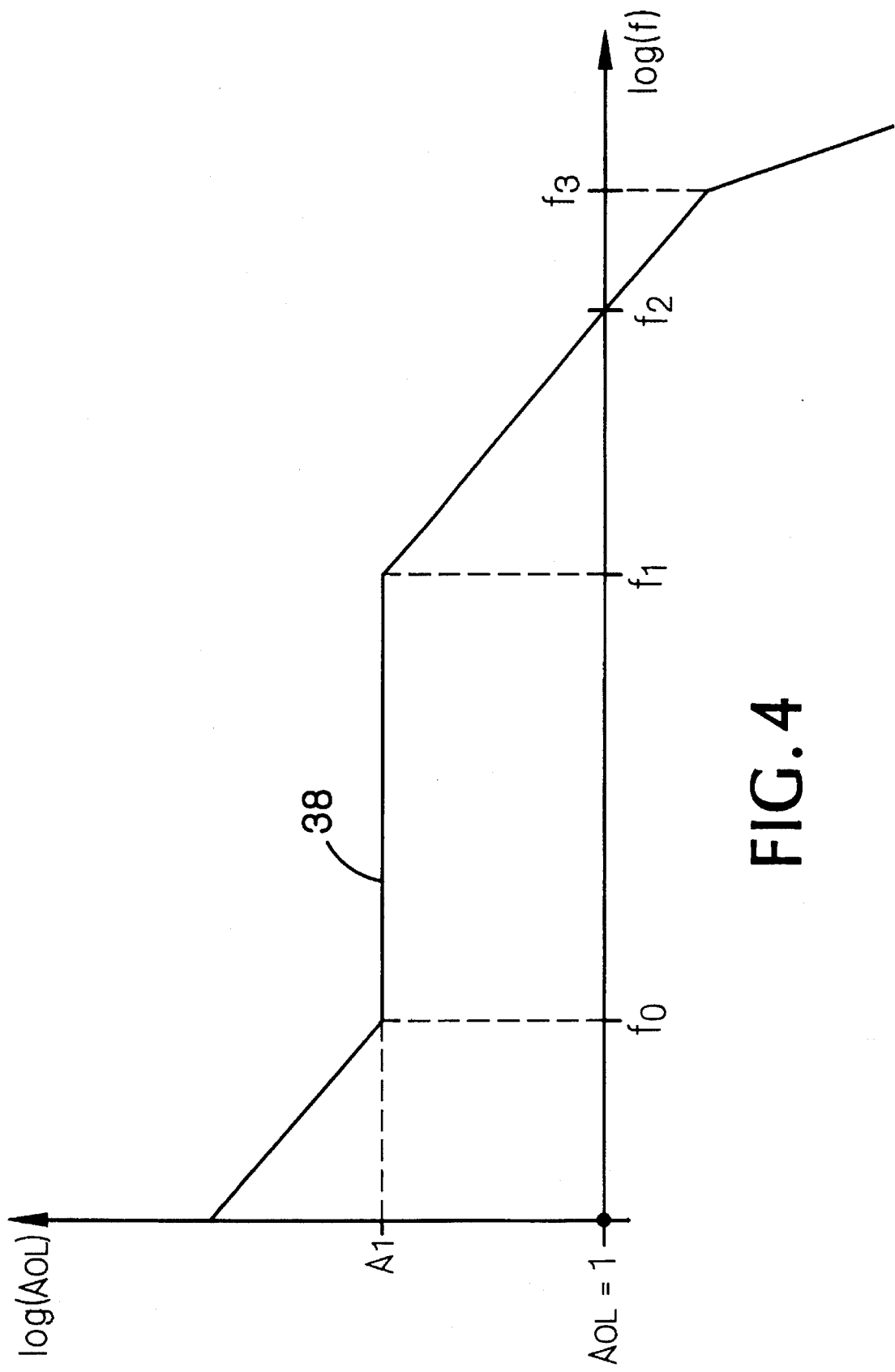
FIG. 4 is another plot of open-loop gain vs. frequency.
Figure 5:
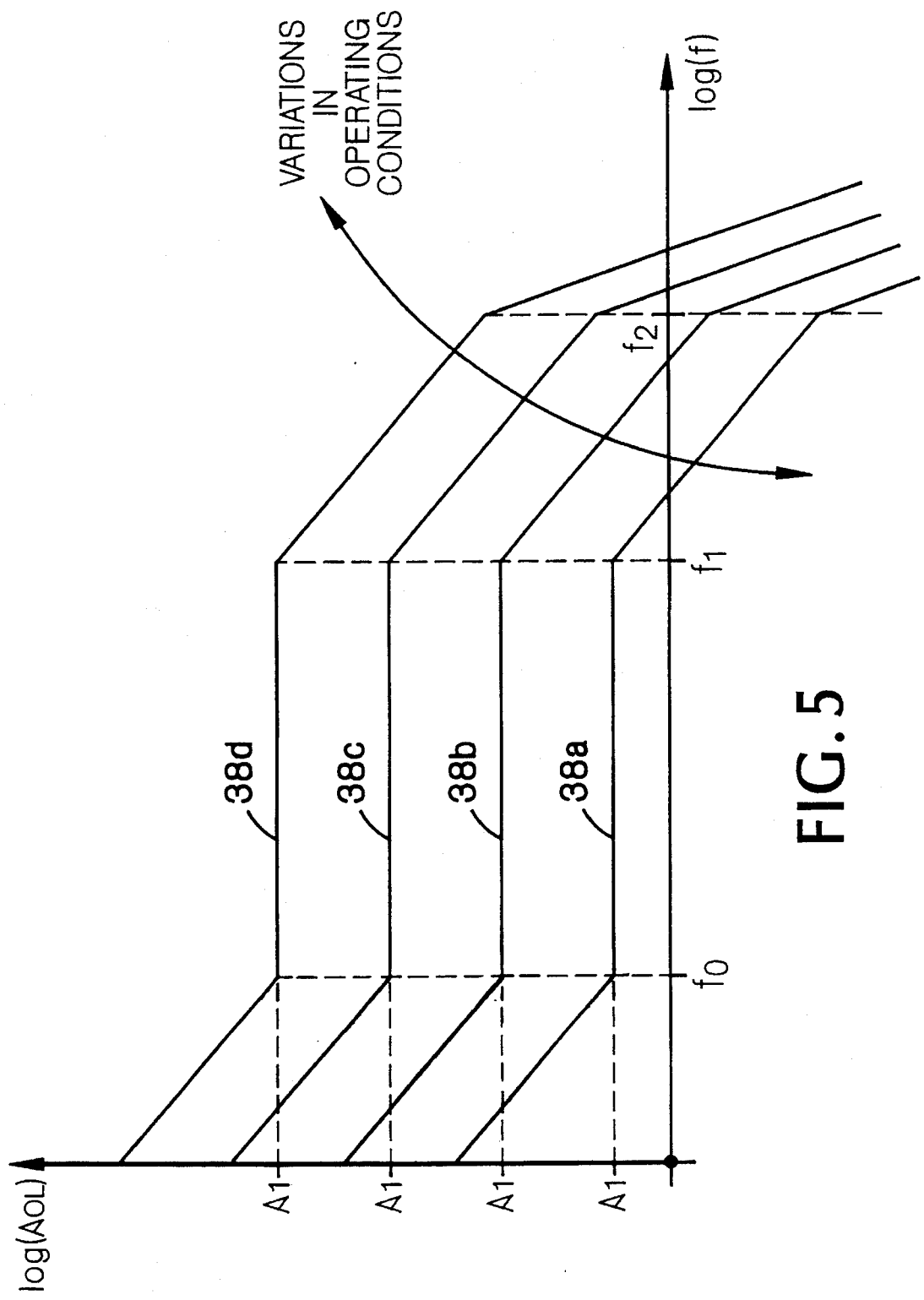
FIG. 5 is a family of plots of open-loop gain vs. frequency.

A transfer function for any particular element, and hence the gain characteristics of that element, will be presumed to apply over a range of variation of the frequency fs. It will also be assumed that, above some frequency, the transfer functions and gains of each element are arranged so that the overall transfer function and gain of the open-loop system satisfy criteria for closed-loop stability and performance (e.g., as shown in FIGS. 2, 4, and 5). By "arranged" we mean that the frequency characteristics of a particular gain element may be intentionally determined (as by the purposeful addition of compensating components to shape the frequency response characteristics of a controller element), or that the frequency characteristics result from the effects of circuit components and circuit parasitics that are otherwise present within a particular element (such as the output filtering elements which are present in a switching power conversion stage). In the discussion which follows, references to transfer functions and gains will, unless otherwise specified, refer to behavior over a range of frequencies from DC to a frequency f1, where f1 is the frequency above which the midband gain is rolled off to ensure stable closed-loop operation (e.g., frequency f1 in FIGS. 2, 4, 5). Also, a single gain element may be used to represent a combination of several subsidiary elements. For example, the gain element 102 in FIG. 6 may include an amplifier, an isolation element, and additional elements (e.g., like element 228 in FIG. 12). The transfer function and gain of the element, however, are indicative of the combined effects of all of the subsidiary elements of which the element is comprised.

The transfer function of a gain element is often dependent upon variables other than the element's input control signal. For example, if the transfer function of FIG. 7 is for a power conversion stage, then for a fixed value of control input (e.g. Vcont1), the output of the stage, Vout, may also depend upon the values of operating temperature, T, and input voltage, Vin. As these other variables change in value, so too will the transfer function and gain of the element, as indicated by the additional transfer function plots 52, 54 shown as dashed lines in FIG. 7. To distinguish between the kinds of variables which affect signal conditions within the loop it will be useful to define certain terms.

Figure 1:
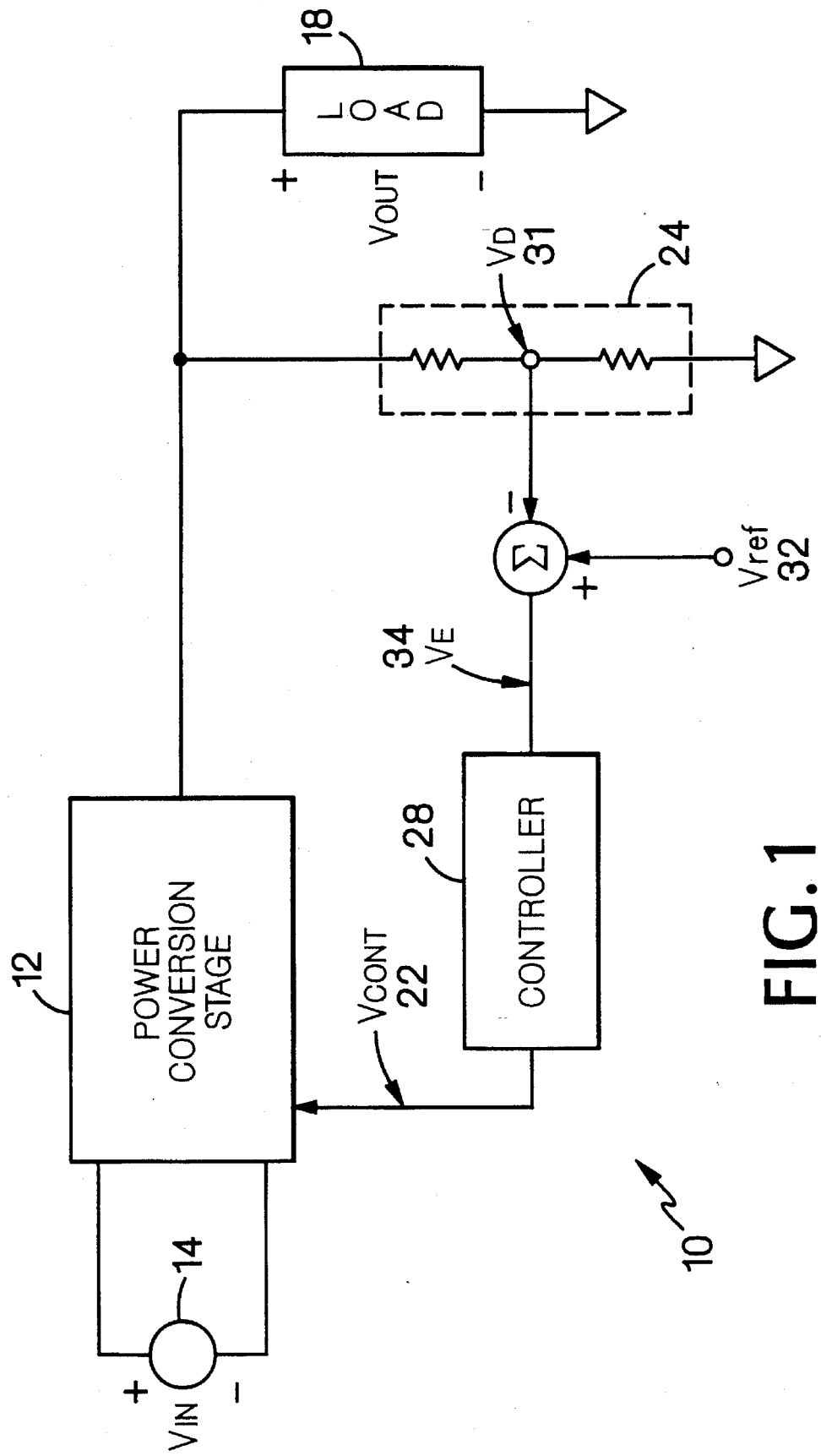
FIG. 1 is a block diagram of a feedback control system.

Each element in a closed-loop system has at least one input signal and at least one output signal (in the loop of FIG. 6, elements 102, 104 each have exactly one input signal and one output signal). A controlled variable is defined as the output signal delivered by an element. A control variable is an input to an element which is also the output of another element in the loop. For example, in FIG. 6, Vcont and Vd are controlled variables (e.g., output signals) of elements 102 and 104 respectively. Vcont is the control variable for element 104 which is derived from the output of element 102; Ve is the control variable of element 102, which is derived from the output of element 104 (via summing junction 103). Thus, within the loop, each control variable is also a controlled variable. Other variables may also affect the output of an element, but these variables, which we refer to as "perturbing variables," are not derived from the output of elements which form the loop (i.e., they are not controlled variables). In one example, the value of Kg, and hence the transfer function and gain of element 104, may be affected by operating temperature. Operating temperature, however, is not a controlled variable (i.e., it is not the output of any of the other loop elements); it is therefore a perturbing variable. Likewise, variations in Vin may affect the output of the power conversion stage 12 of FIG. 1. Since Vin, however, is not a controlled variable it too is a perturbing variable. With reference to FIG. 7, a transfer function (e.g., transfer function 50) defines the relationship between the controlled and the control variables for a gain element with all values of perturbing variables being fixed. Variations in perturbing variables result in different transfer functions (e.g., transfer functions 52, 54). Examples of typical perturbing variables include environmental conditions (e.g., temperature, altitude, pressure); bias or input voltages to loop elements; and variations in values of components.

Returning again to FIG. 6, assume that the first gain element has a transfer function Vcont=h1(Ve). The output of the first gain element, Vcont, is delivered to a second gain element which has a transfer function of the form $$Vd=Kg*(Vcont)^z \quad (1)$$

where Kg and z are independent of Vcont. Combining the transfer functions of both elements, the open-loop transfer function of the system is:

$$Vd=Kg*(h1(Ve))^z \quad (2)$$

and the open-loop gain of the system, at a particular operating point, is:

$$Aol=\delta Vd/\delta Ve=z*Kg*(h1(Ve))^{z-1}\delta h1(Ve)/\delta Ve=z*[Kg*(h1(Ve))^z]*[1/h1(Ve)]*[\delta h1(Ve)/\delta Ve] \quad (3)$$

where an expression of the form $\delta h1(Ve)/\delta Ve$ indicates the partial derivative of h1(Ve) with respect to Ve and where all values are at an operating point.

Substituting Equation 2 into Equation 3 yields:

$$Aol=z*Vd*[1/h1(Ve)]*[\delta h1(Ve)/\delta Ve] \quad (4)$$

which indicates that if the transfer function, h1(Ve), of the first gain element is of a form such that it satisfies the relationship $$[1/h1(Ve)]*[\delta h1(Ve)/\delta Ve]=Ke \quad (5)$$

where Ke is independent of Ve, then the open-loop gain of the system will be $$Aol=z*Vd*Ke. \quad (6)$$

and variations in the open-loop gain of the system will depend only upon variations in z, Vd and Ke. If, as is frequently the case, the gain of the system is relatively high, then Vd will either be essentially equal to, or very close in value to, the setpoint value Vref; under these circumstances, if z and Ke are constant, then the open-loop gain, Aol, will also be essentially constant and equal to $$Aol=z*Vref*Ke. \quad (7)$$

In an example of a closed-loop system which exhibits the performance predicted by Equation 6, we note that one transfer function which satisfies Equation 5 is:

$$Vcont=h1(Ve)=Kx*\exp(Ke*Ve). \quad (8)$$

Amplifiers having this exponential, or "antilog," transfer function are well documented and are available as standard monolithic integrated circuits (for example, part number 755N "Wideband Log, Antilog Amplifier," manufactured by Analog Devices, Inc., Norwood, Mass. USA).

Figure 8:
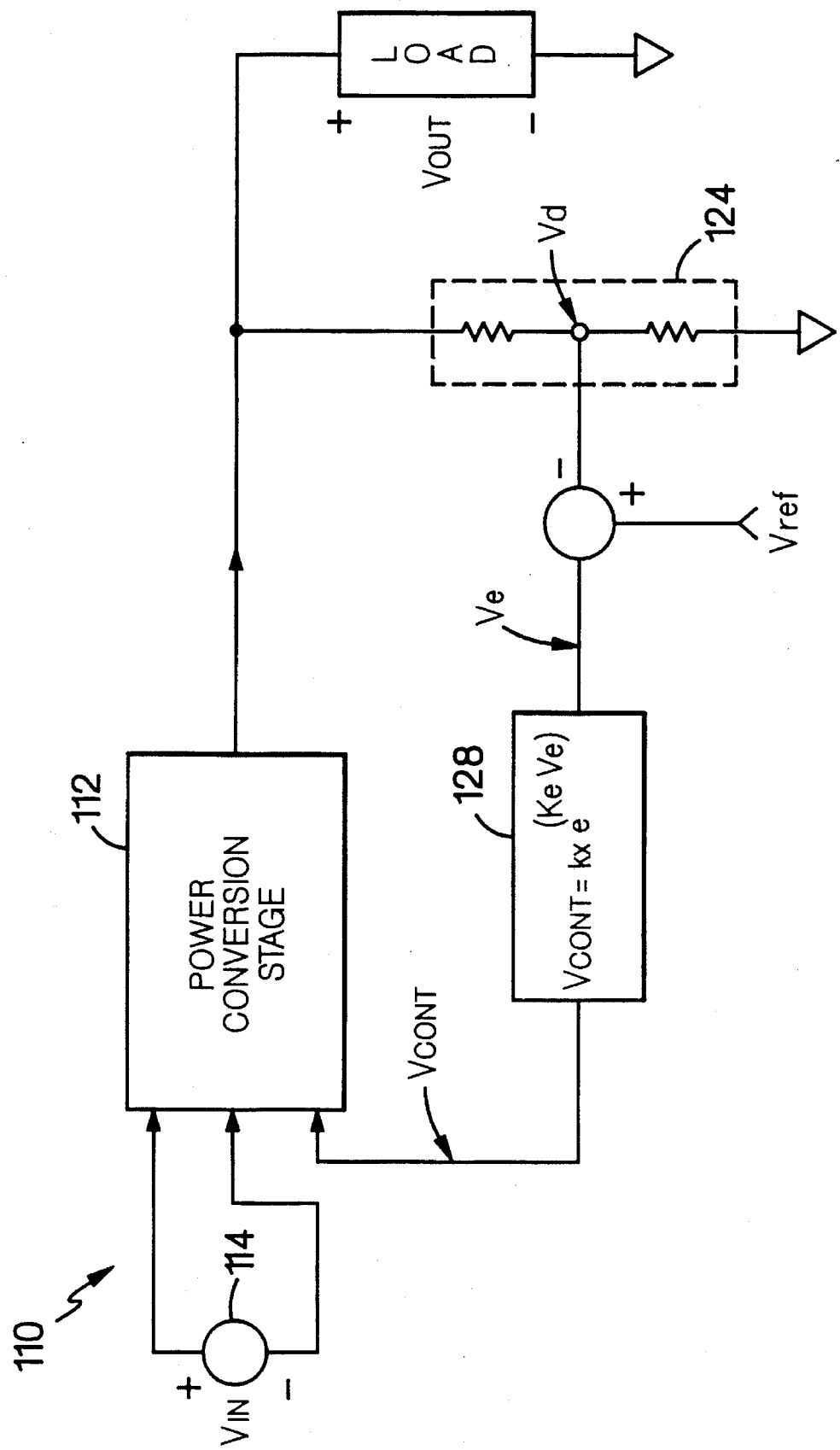
FIG. 8 is a block diagram of a closed-loop power conversion system which includes a gain-adaptive controller.

Referring to the power conversion system 110 of FIG. 8 we will assume that the controller 128 is an antilog amplifier having the transfer function of Equation 8; that the power conversion stage 112 is a PWM converter having a transfer function Vout=Kp*Vin*Vcont (which is of the form of Equation 1 with z=1); and that the divider 124 has a division ratio such that Vd=Kd*Vout, where Kd<1. Combining the transfer functions of each element into an overall open-loop transfer function yields:

$$Vd=Kd*Kp*Vin*Kx*\exp(Ke*Ve). \quad (9)$$

The overall open-loop gain is then given by:

$$Aol=\delta Vd/\delta Ve=Ke*Kd*Kp*Vin*Kx*\exp(Ke*Ve). \quad (10)$$

Substituting Equation 9 into Equation 10 yields:

$$Aol=Ke*Vd \quad (11)$$

which corresponds to the open-loop gain predicted by Equation 5 for a value of z=1.

If the output of the closed-loop system, Vd is close in value to Vref, then the open-loop gain is closely approximated by:

$$Aol=Ke*Vref \quad (12)$$

Equation 12 indicates that the open-loop gain of the system is solely a function of Vref and Ke. In contrast to a system which utilizes a linear amplifier as a controller, and in which variations in the perturbing variable Vin, or variations in Kd, Kp, and K1 due to variations in other perturbing variables, such as temperature, will directly affect open-loop gain; variations in Kd, Kp, Vin, and K1 will have no impact on the overall open-loop gain of the system; only variations in Ke and Vref will affect the open-loop gain.

To illustrate the performance and benefits of the arrangement, we will again assume that the system includes a PWM power conversion stage 112 having a transfer function Vout=Kp*Vin*Vcont and that the value of Kp*Vin for the conversion stage varies from 20 to 180. This might represent the effects of a variation of Vin over a 4:1 range combined with temperature effects which produce an additional 2:1 variation in the value of Kp. We will also assume that the value of Kx for the antilog amplifier 128 varies from 2 to 22 (an 11:1 range of variation) and that the value of Ke is 40. The values of Vref and Kd will be assumed to be 2.5 Volts and 0.5, respectively, corresponding to a nominal value of Vout of 5 Volts. With reference to FIG. 8 and Equations 9 and 10, the closed-loop operating point (e.g., Ve, Vcont) and the gain, Aol, for the closed-loop system may be calculated over the range of variation of Kx, Ke and Vin. The results are shown in FIG. 9. Despite a combined variation of Kp*Vin and Kx over a range of 99:1 (9900%), the open-loop gain, Aol, only varies between 102.1 and 106.6, a variation of less than 4.5%. These values are predicted exactly by Equation 11, the variation in Aol being due solely to the variation in Vd=Vref−Verr (which results from the finite gain of the loop). However, the gain is sufficiently high that the range of values of Aol are in close agreement with the value predicted by Equation 12 (i.e. Aol=100).

If the antilog amplifier in FIG. 8 were replaced with a linear amplifier having a transfer function which exhibited the same range of variation as the variation in Kx cited above (11:1), and this amplifier were used with the PWM power conversion stage 112 described above, the variation in open-loop gain would be 99:1 (9900%).

Since, as discussed earlier with reference to FIG. 5, variations in open-loop gain (e.g., as a result of the effects of perturbing variables) will directly affect the open-loop crossover frequency, and hence affect closed-loop system performance and stability, use of a controller which provides an open-loop gain characteristic (Equation 6) which is either invariant, or which varies very predictably, with changes in system operating point or environment, offers significant advantages. For example, use of such a controller provides a fixed, or very predictable variation in, crossover frequency, with attendant predictability in closed-loop system performance despite a wide variations in electrical and environmental perturbing variables.

Figure 3:
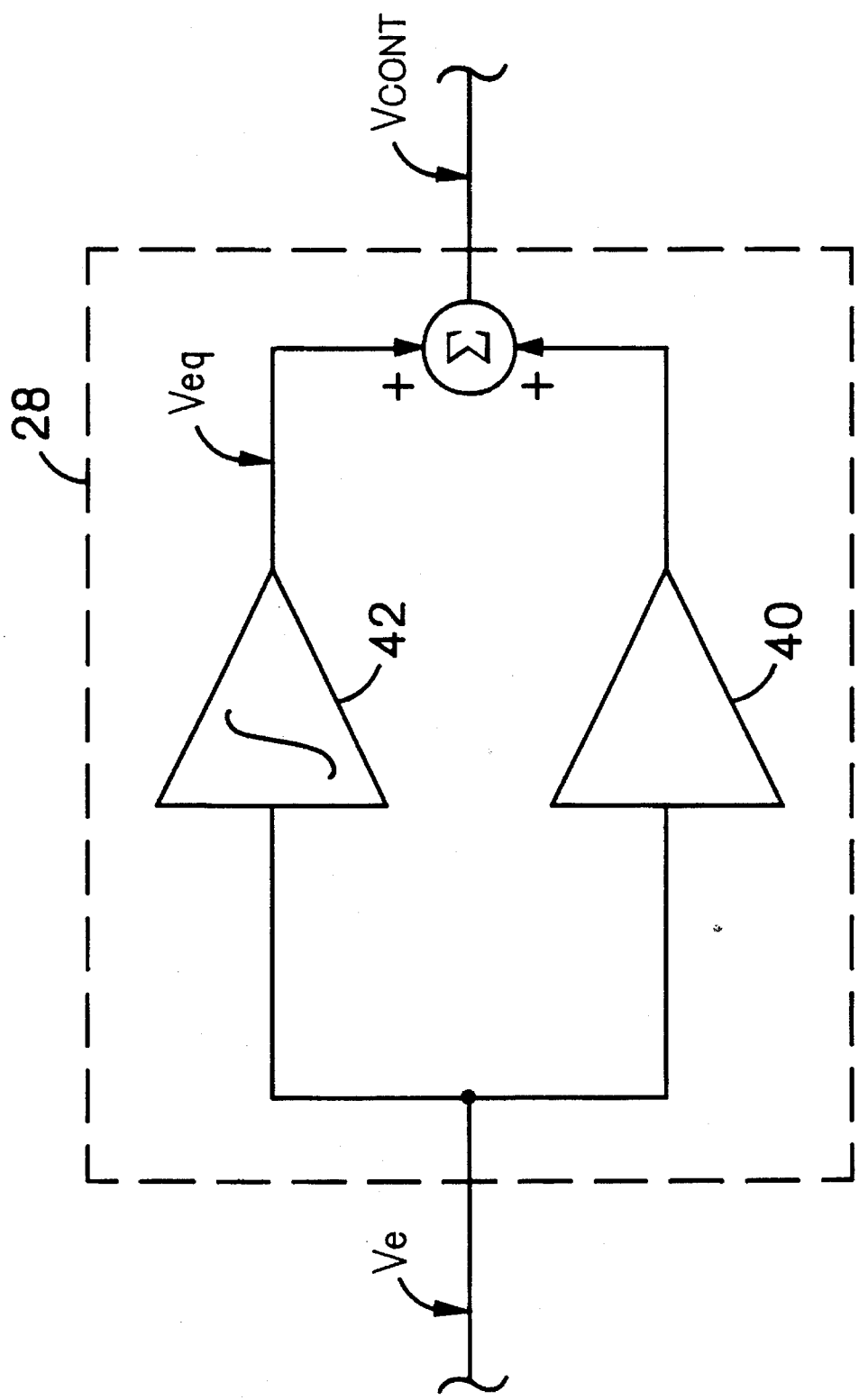
FIG. 3 is a block diagram of a controller for use in a closed-loop system.

In the preceding example, the small variation in open-loop gain was due to the finite error voltage which resulted from the finite gain of the system. As previously discussed with respect to FIGS. 3 and 4, however, there are many cases in which it is desirable to drive the average loop error to essentially zero. One way to do this within the context of the present invention is suggested by Equation 5. Rearranging the Equation yields:

$$\delta h1(Ve)/\delta Ve = Ke * h1(Ve). \quad (13)$$

The left side of Equation 13 is the controller gain (at an operating point); the right side is the output of the controller, Vcont, multiplied by Ke. Therefore, a controller whose gain is proportional to its average output signal will provide the desired result. More specifically, if the average value of Vcont (FIG. 6) is controlled to be at a value Veq which causes the output of the second gain element (104, FIG. 6) to be precisely equal to Vref, and if the gain of the first gain element (102, FIG. 6) is made proportional to Veq, then the open-loop gain of the system will be given by Equation 12. Said another way, if a second gain element has a transfer function of the form shown in Equation 1, it can be shown that if a value of Vcont=Veq results in a second gain stage 112 output equal to Vd=Vref, then the gain of the second gain element at that operating point is equal to Ac=z*Vref/Veq. To maintain a constant loop gain, the gain of the first stage 128 would then have to be proportional to Veq (e.g., Aa=Kx*Veq) since this will result in the product of the gains of the two elements being constant.

Figure 10:
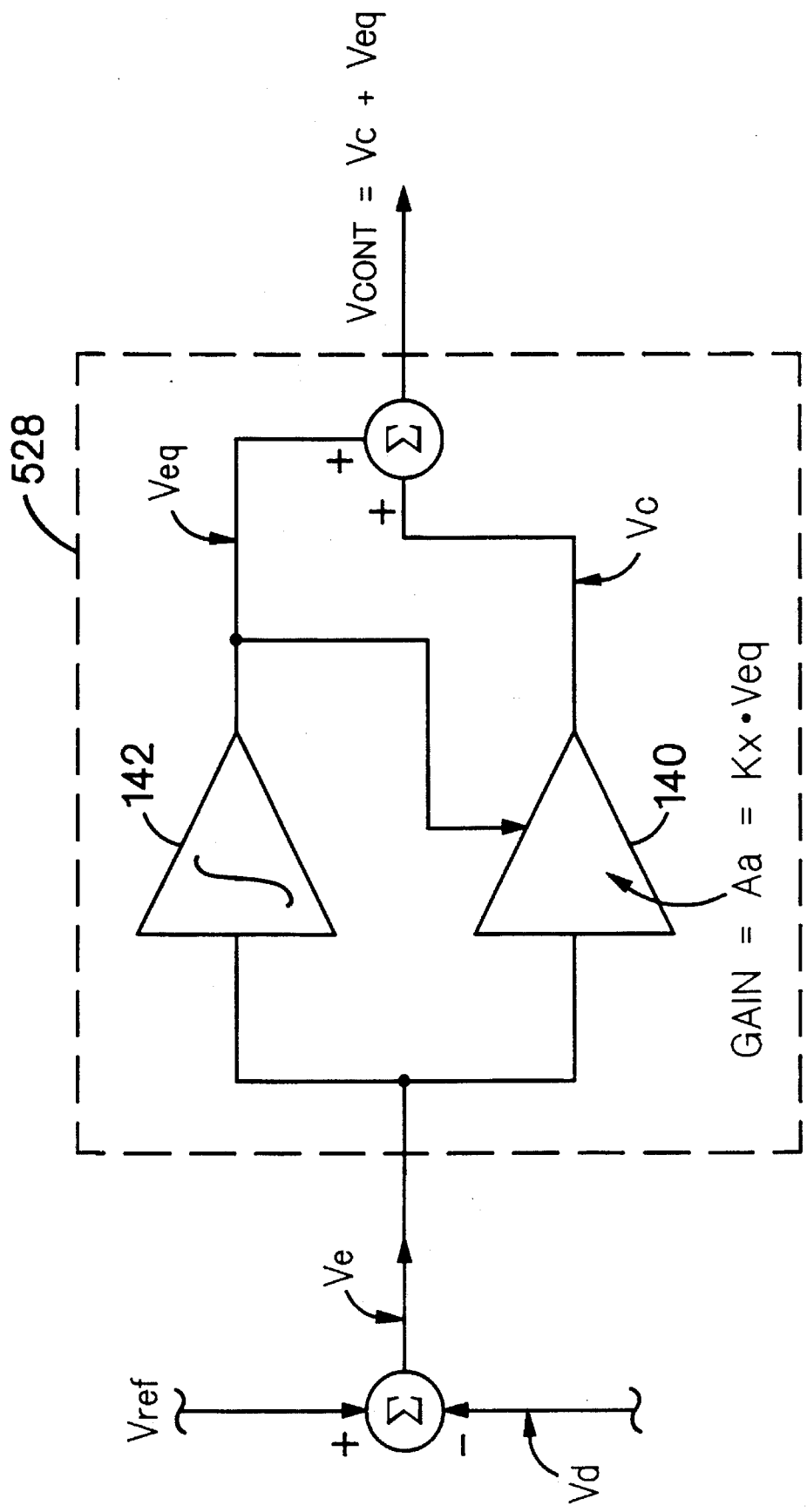
FIGS. 10 and 11 are block diagrams of other gain-adaptive controllers.

One way to do this is illustrated in FIG. 10. Controller 528 (e.g., equivalent to first gain element 102, FIG. 6) includes a low-frequency, narrow bandwidth, very high gain amplifier 142 (e.g., an integrator), which, in the closed loop system, will deliver a signal, Veq, whose average value is just sufficient to drive the average value of the loop error, Ve, essentially to zero. Also included in the controller 528 is a wider bandwidth, gain-variable amplifier 140, having a gain which is proportional to Veq, e.g., Aa=Kx*Veq. A controller 528 of the kind shown in FIG. 10 can be used to produce a gain vs. frequency characteristic like the one shown in FIG. 4, where the high value of DC gain provided by the high gain amplifier 142 results in an insignificant error in the average output voltage. However, since the value of Vd is now essentially constant and equal to Vref, the midband gain will be given by Equation 12 and, if z and Ke are essentially constant, even the small variations in gain exhibited in the example of FIG. 9 will be eliminated.

Figure 11:
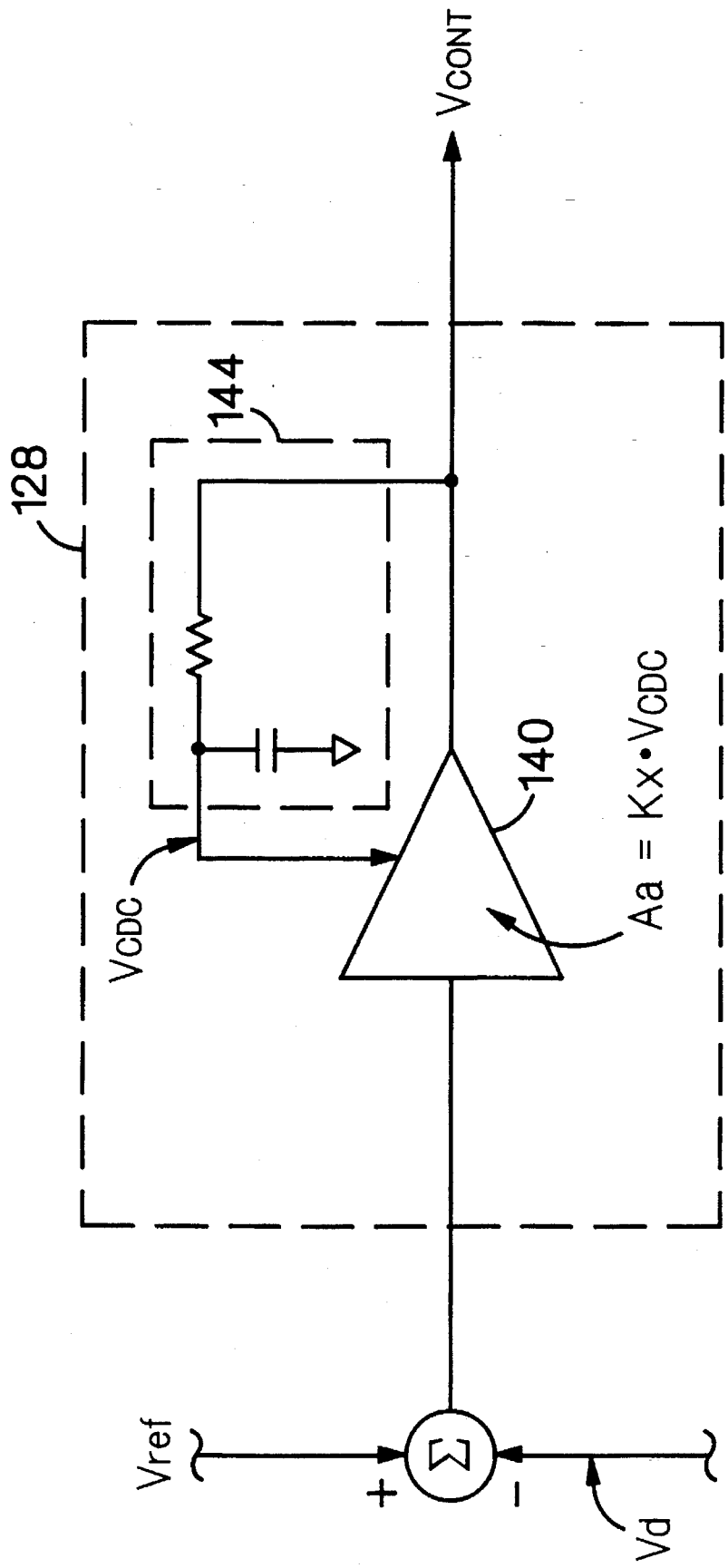

The method of FIG. 10 may also be used without the integrator, as shown in FIG. 11. In this case, the controller 128 uses the same gain-variable amplifier 140 used in the controller of FIG. 10, but the DC component of Vcont, Vcdc, is derived by means of a low-pass filter 144 and used to set the gain of the amplifier 140. This will produce results similar to those shown in FIG. 9 since the average value of Ve will not be driven to zero.

Controllers of the kind shown in FIGS. 8, 10 and 11 for use in closed-loop systems for which the transfer function of the balance of the gain elements in the loop (e.g., second gain element 112 of FIG. 8) is of the form shown in Equation 1, will be referred to as "gain-adaptive" controllers.

As indicated by Equation 1, similar open-loop gain behavior can be achieved if a gain-adaptive controller is combined with nonlinear second gain elements (e.g., second gain elements having transfer functions of the form shown in Equation 1 with a value of z≠1). One example of an element having a transfer function whose behavior is approximated by Equation 1 is a zero-current switching converter (e g., as described in Vinciarelli, "Forward Converter Switching at Zero Current," U.S. Pat. No. 4,415,959, incorporated by reference). For a current-sinking load, such a converter has a transfer function which is approximated by Vout=Kw*Vcont/Iout, where Vcont is a control signal input indicative of converter operating frequency and Iout is the output current delivered to the load. If, in the system 110 of FIG. 8, the power conversion stage 112 is a zero-current switching converter and the load 118 is a current sinking load, then the open-loop gain will be given by Equation 6 with a value of z=1. On the other hand, for the same converter 112 operating into a resistive load 118 the converter transfer function is approximated by Vout= sqrt(Kw*Vcont*Ro) where Ro is the resistance of the load. In this case, the system will exhibit the open-loop gain of Equation 5 with a value of z=½. If the controller 128 of FIG.

8 were replaced with the controller 528 of FIG. 10, then the open-loop gains of the systems (e.g., current-sinking and resistive loads) would be given by Equation 6 with Vd=Vref.

Figure 12:
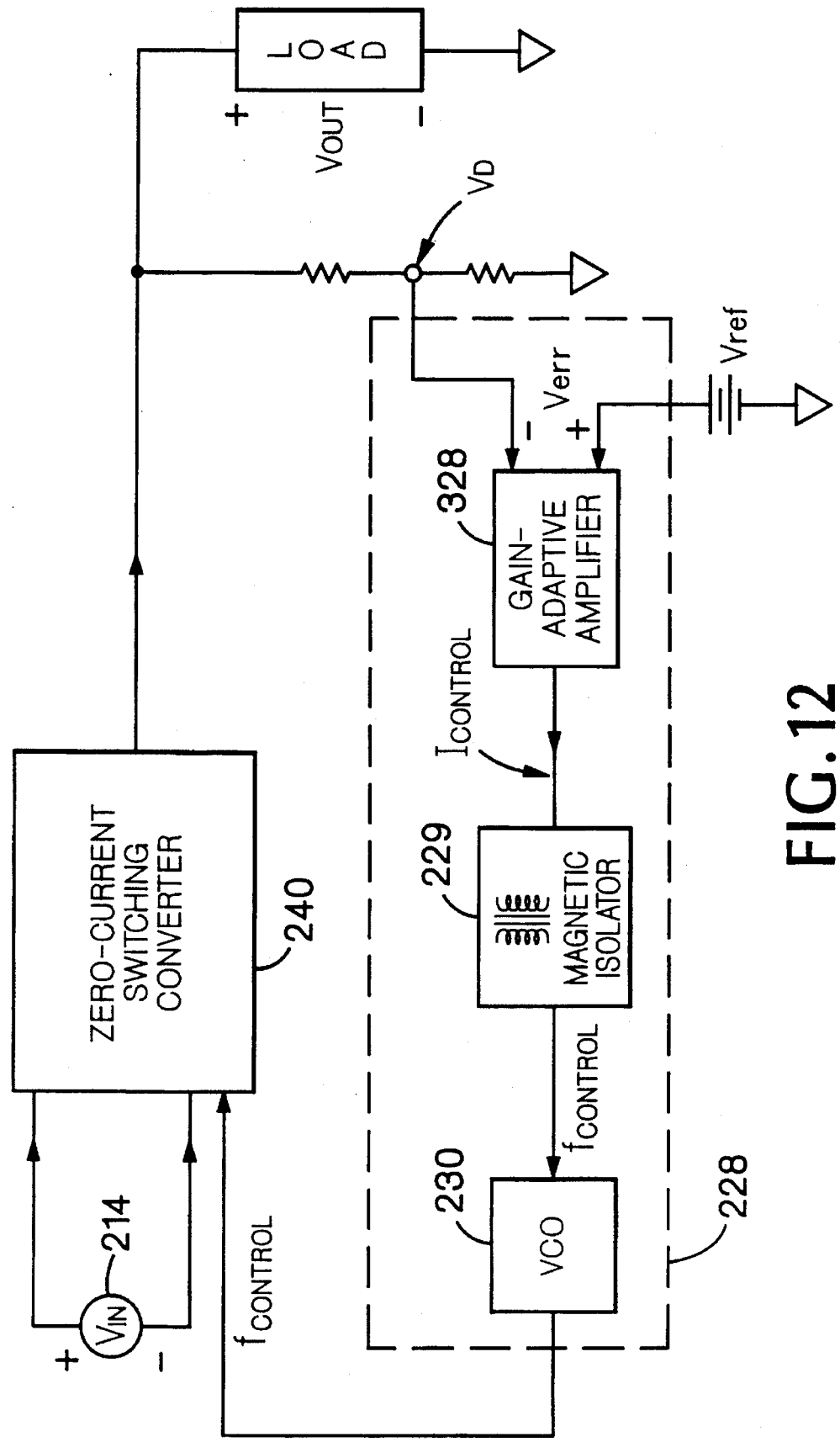
FIG. 12 is a block diagram of another closed-loop power conversion system.

One embodiment of a gain-adaptive controller 228, of the kind shown in FIG. 10, is described with reference to FIGS. 12 and 13. In FIG. 12, a closed-loop DC-DC power conversion system consists of a zero-current switching converter 240 and a controller 228. Within the controller 228, a gain-adaptive amplifier 328 delivers a current, Icontrol, which, via a magnetically isolated coupling circuit 229, controls the frequency, fcontrol, of a voltage-controlled oscillator 230. The frequency fcontrol sets the operating frequency of the ZCS converter 240. In application, maximum converter operating frequency (e.g., 1 Megahertz) and power output is achieved when the controller output current, Icontrol, equals approximately 2 milliamperes. Details of one such system are described in Vinciarelli, et al, "Power Converter Configuration, Control and Construction," U.S. patent application Ser. No. 08/077,011, incorporated by reference.

Figure 13:
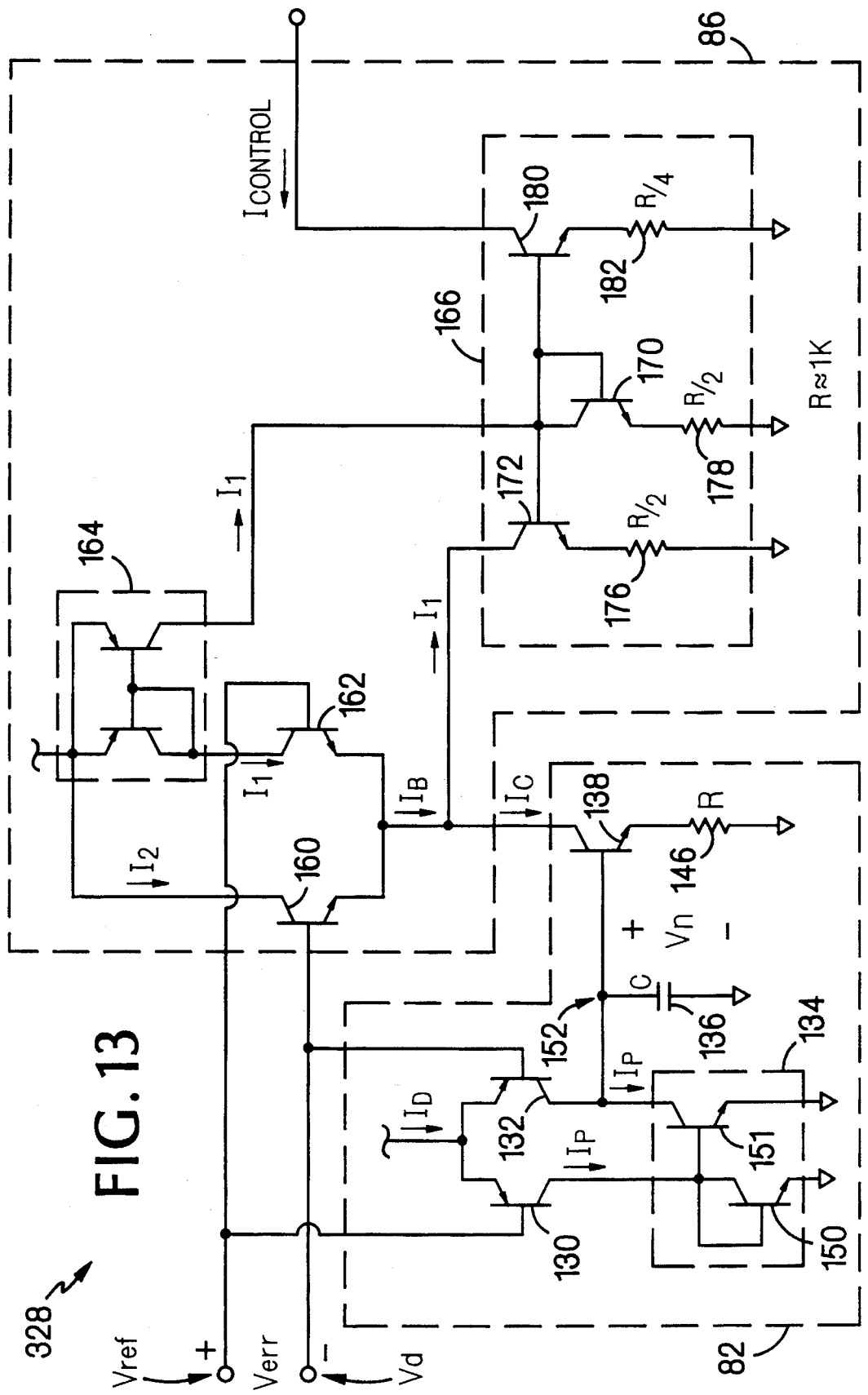
FIGS. 13 and 14 are circuit diagrams for gain-adaptive amplifiers.

A circuit schematic of the gain-adaptive amplifier 328 is shown in FIG. 13. Amplifier 328 includes two amplifiers: a narrow bandwidth, high gain, amplifier 82 and a wider bandwidth, lower gain, amplifier 86. The total error voltage, Verr (e.g., the difference between Vref and Vd in FIG. 12) appears across the inputs to both amplifiers. At the input to the high gain amplifier 82, Verr feeds a pair of PNP transistors 130, 132 connected as a differential amplifier. The amplifier is biased with a current Id (approximately 375 microamperes). A current mirror 134, consisting of two matched NPN transistors 150, 151, mirrors the collector current, Ip, of transistor 130 into the node 152 connected to the collector of transistor 132 and capacitor 136. The voltage at the node 152, Vn, appears across the base of bias transistor 138 and resistor 146 (which has a value R approximately equal to 1000 ohms). The DC transconductance of such an amplifier (i.e. the ratio of the collector current, Ic, of transistor 138 to the DC component of Verr, Vdc) can be shown to be approximately equal to:

$$Ic/Vdc = Id*Rcomp/2*Vt*R \qquad (14)$$

Where Rcomp is the DC impedance at the node to which C is connected, and where Vt is equal to $k*Ta/q$ (k=Boltzmann's constant=$1.381 \times 10^{-23}$ Joule/degree K; Ta=absolute temperature, in degrees Kelvin; q=electron charge= $1.602 \times 10^{-19}$ coulomb). For a value of R=1K, and assuming that transistor 138 has a DC current gain of 150, the value of Rcomp is approximately 100,000 ohms. At room temperature (Ta=273 K), then, the DC transconductance of the combination of the high gain amplifier 82 and the bias transistor 138 is approximately 0.72 Amperes/Volt. As will be shown below, this high value of DC transconductance will reduce the DC component of Verr to an essentially insignificant value (e.g., less than 3 millivolts). The bandwidth of the high-gain amplifier 82 is determined by the value of capacitor 136 and the node impedance, Rcomp. For a capacitor of value C=0.1 microfarads, the transconductance of amplifier 82 will start to decline linearly with frequency above a first breakpoint frequency of approximately $1/(2*pi*Rcomp*C)=16$ Hertz.

The (essentially DC) current, Ic, delivered by the bias transistor 138 forms a portion of the bias current, Ib, delivered to the emitters of the differential pair of NPN transistors 160, 162 in the wider bandwidth amplifier 86. As shown in FIG. 13, the collector current of transistor 162, I1, is reflected (via current mirror 164 and transistors 170, 172 and resistors 176, 178 in dual current mirror 166) into the collector of transistor 172 and summed with the current Ic to form the bias current Ib. Thus, Ib=Ic+I1. Since Ib is also equal to I1+I2, then I2=Ic. When the closed-loop system is in balance, the DC component of Verr will be essentially zero; the DC voltage between the bases of transistors 160, 162 will be essentially zero, and both the DC base-emitter voltages and the DC collector currents of transistors 160, 162 will be essentially equal. Therefore, if the DC component of I2=Ic, then the DC component of I1 will also equal Ic. The current I1=Ic is mirrored into Icontrol by the portion of the dual current mirror formed by transistors 170, 180 and resistors 178, 182. Because resistor 182 is one-half the value of resistor 178, however, the DC component of Icontrol is equal to 2*Ic. Thus, the overall DC transconductance from the input of amplifier 82 to the output of amplifier 86 is twice the previously cited transconductance (Equation 14) of the combination of the high gain amplifier 82 and the bias transistor 138, or approximately 1.44 Amperes/Volt. If a DC value of Icontrol=2 milliamperes results in full power output of the ZCS converter (240, FIG. 12), then the DC component of the Verr needed to achieve full power throughput will be approximately 1.4 millivolts. If the converter reference voltage, Vref, were 2.5 Volts this error voltage would represent an output voltage error of less than 0.06%.

At higher frequencies, as the gain of the high-gain amplifier 82 declines, the gain of the wider bandwidth amplifier 86 becomes dominant and sets the midband gain of the system. The gain of the differential pair of transistors 160, 162 is a function of the bias current Ib. As noted above, when the closed-loop is in equilibrium, the DC value of this current is Ib=2*Ic (where Ic is given by Equation 14) and the DC component of the currents I1 and I2 are each equal to Ic. It can be shown that the gain of the differential pair is closely approximated by:

$$\delta I1/\delta Verr = (Ic/Vt)*\exp(Verr/Vt) \qquad (15)$$

and, since the mirror 166 doubles this current, the midband gain of the amplifier is:

$$Aa = \delta Icontrol/\delta Verr = (2*Ic/Vt)*\exp(Verr/Vt) \qquad (16)$$

For values of Vin small with respect to Vt, this reduces to Aa=2*Ic/Vt and Ke=2/Vt. Equation 16 indicates that the gain of the amplifier 86 is proportional to its average output current, Ic, which, as discussed above with respect to Equation 13, is the condition necessary to achieve the open-loop gain behavior predicted by Equation 6.

In summary, the gain-adaptive amplifier 328 of FIG. 13 produces an output current Icontrol which includes a DC component approximately equal to 2*Ic, where Ic is the current needed to drive the closed-loop error essentially to zero (i.e., Vd=Vref). The current Ic is set by the high-gain amplifier 82 and is passed through the lower gain amplifier 86 via the bias current Ib. The gain of the lower gain amplifier is also set by the value of Ic, thereby making the gain of the amplifier dependent upon its average output current. Therefore, the high-gain amplifier 82 is equivalent to amplifier 142 of FIG. 10; the essentially DC current Ic is equivalent to the signal Veq of FIG. 10; and the lower gain amplifier 86 corresponds to amplifier 140 of FIG. 10.

The open-loop gain of the system of FIG. 12 will behave as shown in FIG. 4, where the midband open-loop gain will be equal to:

$$A1 = z*Ke*Vref = 2*z*Vref/Vt. \qquad (17)$$

As noted earlier, for a zero-current switching converter, z may be between 0.5 and 1 depending upon the characteristics of the load (e.g., current sinking or resistive). Assuming that z=1 and Vref=2.5 V the midband gain will be A1=192 at 25 C (298K). We also note that the amplifier of FIG. 13 does not have a constant value of Ke, but that Ke is dependent upon absolute temperature (Ke=2/Vt=(2*q)/(k*T)). As temperature varies from −55° C. to +105° C. (218K to 378K) the value of Ke will vary from 0.019 Volts to 0.033 volts; Ke will vary from 105.2 to 60.6; and A1 will vary from 264 to 152. We again note that variations in gains of the other elements in the loop, due to variations in Vin or other perturbing variables, will have no effect on the open-loop gain provided only that the behavior of the combined transfer functions of those elements is substantially in accordance with the behavior indicated in Equation 1.

Figure 14:
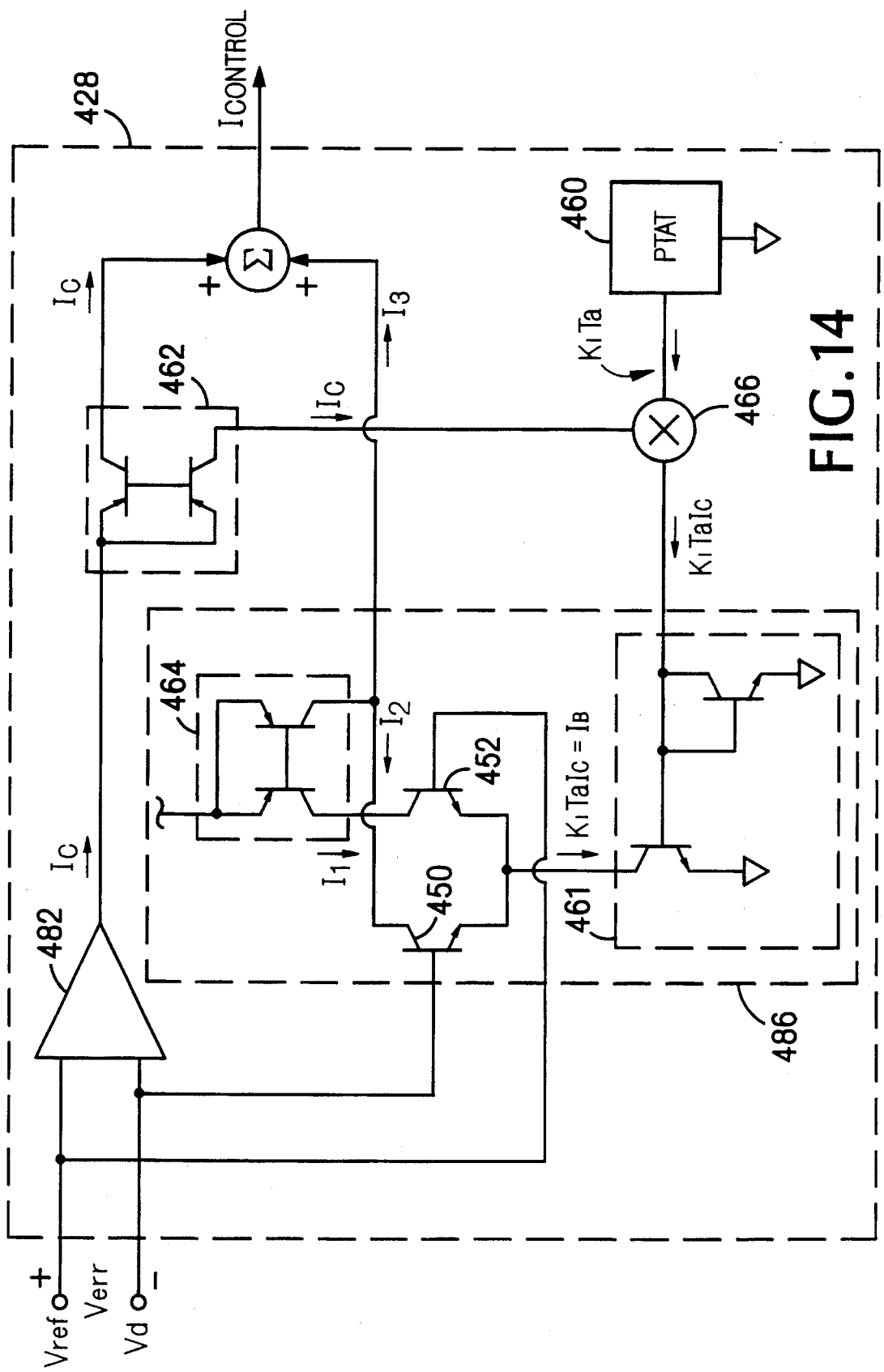

The gain-adaptive amplifier embodiment of FIG. 13 trades a small, and predictable, amount of temperature dependence for circuit simplicity. There are many other temperature compensated circuits which achieve the same result. For example, FIG. 14 shows a block diagram of one such amplifier. In the Figure, the gain-adaptive amplifier 428 includes a high gain, narrow bandwidth amplifier 482 (which might be the same as amplifier 82 in FIG. 13) which generates the DC current, Ic, required to drive the DC component of the closed-loop error, Verr, essentially to zero. Current mirror 462 reflects Ic into one input of multiplier 466 (a variety of multiplier circuits are described in Section 6 of the Analog Devices 1990/91 Linear Products Databook, published by Analog Devices, Inc., Norwood, Mass., USA). The other input receives a current of value K1*Ta, where K1 is a constant and Ta is absolute temperature (an example of a device which delivers a signal proportional to absolute temperature (a "PTAT") is part number AD590, manufactured by Analog Devices and described on page 12-7 in the previously referenced Analog Devices databook and in U.S. Pat. No. 4,123,698). The output of the multiplier, which is a current equal to the product of the two currents, is delivered to current mirror 461 and reflected as a bias current, Ib=K1*Ta*Ic, into the emitters of the pair of differentially connected NPN transistors 450, 452 included in the wider bandwidth amplifier 486. Since the high-gain amplifier 482 sets Ic to a value which makes the closed-loop value of the DC component of Verr essentially zero, the DC components of the collector currents I1 and I2 are essentially equal. Current mirror 464 is arranged so that the current I3 is equal to the difference between I1 and I2, causing the DC component of I3 to be essentially zero. The value of I3 is closely approximated by:

$$I3=Ib*\exp(Verr/Vt). \quad (18)$$

and the gain of amplifier 486 is:

$$\delta I3/\delta Verr=(Ib/Vt)*\exp(Verr/Vt)=(K1*Ic*q/k)*\exp(Verr/Vt) \quad (19)$$

which, for values of Verr which are small relative to Vt, reduces to:

$$\delta I3/\delta Verr=K1*q*Ic/k \quad (20)$$

where k=Boltzmann's constant. The gain is independent of temperature and results in a value of Ke=K1*q/k.

It should be noted that if the high gain amplifier 82 of FIG. 13 is used for the amplifier 482 of FIG. 14, there will still be a temperature dependence in the DC transconductance (e.g., Equation 14 includes Vt). In practical applications the effects are insignificant: the low frequency gain is so high to begin with that the effect of temperature variations on DC output regulation will be unimportant. Similarly, the low frequency behavior has little effect on loop transient performance or stability since the midband gain, A1, and crossover frequency, f2, are primarily functions of the gain of the wider bandwidth amplifier (e.g., amplifier 486, FIG. 14). Clearly, a high gain amplifier having little or no temperature dependence (e.g., an operational amplifier configured as an integrator) may be used with an attendant further increase in circuit complexity.

Other embodiments are within the scope of the following claims:

What is claimed is:

1. A closed-loop feedback system comprising
   a first gain element having a transfer function such that $Xd=Kg * (Xcont)^z$, where Xcont is a control variable input signal of the first gain element, Xd is a controlled variable output signal of the first gain element, and Kg and z are independent of Xcont, and
   a second gain element having a transfer function h1 such that $Xcont=h1(Xe)$ where Xe is a control variable input signal of the second gain element and Xcont is a controlled variable output signal of the second gain element,
   wherein the function h1 is of a form which satisfies $[1/h1(Xe)]*[\delta h1(Xe)/\delta Xe]=Ke$
   where Ke is independent of Xe.

2. The system of claim 1 wherein the function h1 is of the form $h1(Xe)=Kx*\exp(Ke,Xe)$ where Kx and Ke are independent of Xe.

3. The system of claim 1 further comprising, as an input to the system, a setpoint value, Xref, indicative of a desired value for an output signal, Xd, of the system.

4. The system of claim 3 having an open-loop gain, Aol, essentially equal to z*Ke*Xd.

5. The system of claim 1 wherein the gain of the second gain element is proportional to its average output signal.

6. The system of claim 5 wherein the second gain element comprises circuitry comprising
   a gain variable amplifier having a gain control input, and
   a control circuit having a gain control output connected to the gain control input of the gain variable amplifier.

7. The system of claim 6 wherein the control circuit comprises a high-gain amplifier.

8. The system of claim 7 wherein the high-gain amplifier has a bandwidth narrower than the bandwidth of the open-loop characteristic of the system.

9. The system of claim 6 wherein the gain variable amplifier has an output, the control circuit has an output, and the outputs are summed in a summing element.

10. The system of claim 6 wherein the gain variable amplifier has an input, the control circuit has an input, and both of the inputs are connected to receive the same input signal.

11. The system of claim 10 Wherein the input signal is an error signal, Xe, indicative of the degree to which an output of the system, Xd, differs from a predetermined setpoint value, Xref, which is an input to the system.

12. The system of claim 11 wherein the open-loop gain of the system, Aol, is essentially equal to z*Ke*Xref.

13. The system of claim 6 wherein the control circuit comprises an integrator.

14. The system of claim 6 wherein the control circuit comprises a low-pass filter.

15. The system of claim 14 wherein the low-pass filter has an output connected to the gain control input of the gain variable amplifier, and the low-pass filter has an input connected to an output of the gain control amplifier.

16. The system of claim 1 wherein the first gain element comprises a power converter connected between a source and a load.

17. The system of claim 16 wherein the power converter has a controlled variable frequency of operation and the frequency of operation is controlled based on a control signal received at an input of the power converter.

18. The system of claim 16 wherein the second gain element comprises a controller having an input connected to the output of the power converter, and an output connected to the control input of the converter.

19. The system of claim 18 wherein the controller includes an isolation element for galvanically isolating the output of the controller from the input of the controller.

20. The system of claim 19 wherein the isolation element comprises a magnetic coupler.

21. The system of claim 18 wherein the controller comprises a gain adaptive amplifier, the gain of the gain adaptive amplifier being proportional to the average value of the output of the controller.

22. The system of claim 16 wherein the power converter comprises a pulse-width modulated power converter.

23. The system of claim 16 wherein the power converter comprises a zero-current switching power converter.

24. The system of claim 1 wherein the open loop gain of the system comprises a constant gain in a mid-band of frequencies, and, in other frequency bands, a gain that declines with increasing frequency.

25. The system of claim 1 wherein the first gain element comprises subelements and the transfer function of the first gain element is a composite transfer function.

26. The system of claim 1 wherein the second gain element comprises subelements and the transfer function of the second gain element is a composite transfer function.

27. The system of claim 3 wherein Xd, Xe, Xref, and Xcont are each a voltage or a current.

28. A closed-loop feedback system comprising a first gain element having a transfer function such that $Xd=Kg*(Xcont)^z$, where Xcont is a control variable input signal of the first gain element, Xd is a controlled variable output signal of the first gain element, and Kg and z are independent of Xcont, a second gain element having a transfer function h1 such that $Xcont=h1(Xe)$ where Xe is a control variable input signal of the second gain element and Xcont is a controlled variable output signal of the second gain element, the second gain element comprising circuitry having a gain proportional to the average value of the output of the second gain element, and as an input to the system, a setpoint value, Xref, indicative of a desired value for an output signal, Xd, of the system, the open loop gain of the system being substantially equal to $Aol=z*,Ke*,Xd$ over a range of frequencies.

29. The system of claim 28 wherein the function h1 is of a form $h1(Xe)=Kx*exp(Ke*Xe)$ where Kx and Ke are independent of Xe.

30. The system of claim 28 wherein the gain declines with increasing frequency at frequencies which are not within the range of frequencies.

31. A power conversion system for converting power from a source for delivery to a load, the conversion system comprising a closed-loop feedback system having a power converter having a transfer function such that $Xd=Kg*(Xcont)^z$, where Xcont is a control variable input signal of the power converter, Xd is a controlled variable output signal of the power converter, and Kg and z are independent of Xcont, a controller having a transfer function h1 such that $Xcont=h1(Xe)$ where Xe is a control variable input signal of the controller and Xcont is a controlled variable output signal of the controller, the controller comprising circuitry having a gain proportional to the average value of the output of the controller, and as an input to the system, a setpoint value, Xref, indicative of a desired value for an output signal, Xd, of the system, the open loop gain of the system being substantially equal to $Aol=z*Ke*Xd$ over a range of frequencies.

32. The power conversion system of claim 31 wherein the function h1 is of a form $h1(Xe)=Kx*exp(Ke*Xe)$ where Kx and Ke are independent of Xe.

33. The system of claim 31 wherein the controller comprises a gain variable amplifier having a gain control input, and a control circuit having a gain control output connected to the gain control input of the gain variable amplifier.

34. The system of claim 33 wherein the control circuit comprises a high-gain amplifier.

35. The system of claim 34 wherein the high-gain amplifier has a bandwidth narrower than the bandwidth of the open-loop characteristic of the system.

36. The system of claim 33 wherein the gain variable amplifier has an output, the control circuit has an output, and the outputs are summed in a summing element.

37. The system of claim 33 wherein the gain variable amplifier has an input, the control circuit has an input, and both of the inputs are connected to receive the same input signal.

38. The system of claim 37 wherein the input signal is an error signal, Xe, indicative of the degree to which an output of the system, Xd, differs from a predetermined setpoint value, Xref, which is an input to the system.

39. The system of claim 38 wherein the open-loop gain of the system, Aol, is essentially equal to $z*Ke*Xref$.

40. The system of claim 33 wherein the control circuit comprises an integrator.

41. The system of claim 33 wherein the control circuit comprises a low-pass filter.

42. The system of claim 41 wherein the low-pass filter has an output connected to the gain control input of the gain variable amplifier, and the low-pass filter has an input connected to an output of the gain control amplifier.

43. The system of claim 31 wherein the power converter has a controlled variable frequency of operation and the frequency of operation is controlled based on a control signal received at an input of the power converter.

44. The system of claim 43 wherein the controller includes an isolation element for galvanically isolating the output of the controller from the input of the controller.

45. The system of claim 44 wherein the isolation element comprises a magnetic coupler.

46. The system of claim 31 wherein the controller comprises a gain adaptive amplifier, the gain adaptive amplifier having a gain proportional to the average value of the output of the controller.

47. The system of claim 31 wherein the power converter comprises a zero-current switching power converter.

48. A method of causing a closed-loop feedback system to have a generally constant value of open-loop gain, the system being of the kind that has a first gain element having a transfer function such that $Xd=Kg*(Xcont)^z$, where Xcont is a control variable input signal of the first gain element, Xd is a controlled variable output signal of the first gain element, and Kg and z are independent of Xcont, and a second gain element having a transfer function h1 such that $Xcont=h1(Xe)$ where Xe is a control variable input signal of the second gain element and Xcont is a controlled variable output signal of the second gain element, the method comprising causing the transfer function h1 to have a form which satisfies $[1/h1(Xe)]*[\delta h1(Xe)/\delta Xe]=Ke$ where Ke is independent of Xe.

49. The method of claim 48 wherein the function h1 is caused to have the form $h1(Xe)=Kx*exp(Ke*Xe)$ where Kx and Ke are independent of Xe.

50. The method of claim 48 further comprising delivering, as an input to the system, a setpoint value, Xref, indicative of a desired value for an output signal, Xd, of the system.

51. The method of claim 1 further comprising forming an error signal based on the error between an output of the system and a reference value, and causing the error value to approach zero by providing a controller comprising a high gain control circuit and a gain adaptive amplifier and using the average value of an output of the controller as the basis for setting the gain of the gain adaptive amplifier.

\* \* \* \* \*

UNITED STATES PATENT AND TRADEMARK OFFICE
CERTIFICATE OF CORRECTION

PATENT NO.   : 5,490,057

DATED        : February 6, 1996

INVENTOR(S)  : Patrizio Vinciarelli et al.

It is certified that error appears in the above-identified patent and that said Letters Patent is hereby corrected as shown below:

In Col. 5, line 64, in the equation, "(2)" should be moved to the right margin.

In Col. 12, claim 11, line 51, "Wherein" should be --wherein--.

In Col. 13, claim 28, line 50, after "Ke*" delete the comma.

Signed and Sealed this

Twenty-ninth Day of October 1996

Attest:

BRUCE LEHMAN

*Attesting Officer*        Commissioner of Patents and Trademarks